United States Patent
Capelli

(10) Patent No.: US 9,484,720 B2
(45) Date of Patent: Nov. 1, 2016

(54) MEDIUM VOLTAGE SWITCHGEAR

(75) Inventor: Fabio Capelli, Capizzone (IT)

(73) Assignee: ABB TECHNOLOGY AG, Zurich (CH)

( * ) Notice: Subject to any disclaimer, the term of this patent is extended or adjusted under 35 U.S.C. 154(b) by 246 days.

(21) Appl. No.: 14/122,106

(22) PCT Filed: May 22, 2012

(86) PCT No.: PCT/EP2012/059447
§ 371 (c)(1),
(2), (4) Date: Mar. 31, 2014

(87) PCT Pub. No.: WO2012/163723
PCT Pub. Date: Dec. 6, 2012

(65) Prior Publication Data
US 2014/0197016 A1    Jul. 17, 2014

(30) Foreign Application Priority Data
Jun. 1, 2011   (EP) .................................. 11168512

(51) Int. Cl.
*H01H 9/00* (2006.01)
*H01H 11/00* (2006.01)
*H02B 13/025* (2006.01)
*H02B 11/127* (2006.01)

(52) U.S. Cl.
CPC ........... *H02B 13/025* (2013.01); *H02B 11/127* (2013.01)

(58) Field of Classification Search
CPC .. H02B 13/025; H02B 11/127; H02B 11/00; H02B 11/133

USPC ......... 200/50.21, 50.23–50.26, 43.11, 43.14, 200/43.15, 50.06, 50.11, 50.02, 50.05, 200/50.12; 361/605–609, 615
See application file for complete search history.

(56) References Cited

U.S. PATENT DOCUMENTS 3,783,209 A * 1/1974 Cleaveland .......... H02B 11/133
200/50.25

FOREIGN PATENT DOCUMENTS

DE    10033643 A1    1/2002
DE    10040685 C1    1/2002

* cited by examiner

*Primary Examiner* — Renee Luebke
*Assistant Examiner* — Lheiren Mae A Caroc
(74) *Attorney, Agent, or Firm* — Polsinelli PC

(57) ABSTRACT

A medium voltage switchgear (1) which is characterized in that it comprises a casing (2) defining an internal volume for housing at least a circuit breaker assembly (4) movable between at least two operative positions, said casing comprising a front panel (21) provided with an opening (5) for the insertion of an operating handle (8) for actuating the movement of said circuit breaker assembly between said operative positions, a closing and retaining device (6) being positioned in correspondence of said opening (5) and movable between a closed position when said operating handle is not inserted and an open position for allowing insertion of said operating handle, said closing and retaining device (6) comprising locking means for retaining said operating handle in position when inserted in said opening.

20 Claims, 5 Drawing Sheets

MEDIUM VOLTAGE SWITCHGEAR

CROSS REFERENCE TO RELATED APPLICATIONS

This application is a National Phase filing under 35 U.S.C. §371 of PCT/EP2012/059447 filed on May 22, 2012; and this application claims priority to application Ser. No. 11/168,512.9 filed in Europe on Jun. 1, 2011, under 35 U.S.C. §119; the entire contents of all are hereby incorporated by reference.

BACKGROUND OF THE INVENTION

The present invention relates to a medium voltage switchgear with improved features, and in particular to a medium voltage switchgear having a circuit breaker in the so-called withdrawable configuration. For the purposes of the present application the term medium voltage is referred to applications in the range from 1 kV up to some tens of KV, for example 52 kV.

With reference to FIG. 1, a medium voltage switchgear 1 is well known in the art and it usually consists of a casing 2 which defines an internal volume 3 for housing a circuit breaker assembly 4 and, e.g., a bus-bar assembly 39, as well as other systems, such as a feeder system and possible auxiliary equipment.

The circuit breaker assembly 4 is normally positioned inside a circuit breaker compartment, said circuit breaker assembly 4 being, in the so-called withdrawable configuration, movable between a service position, in which it is connected to the bus-bar and feeder systems, and a test/disconnected position in which it is isolated from the bus-bar and feeder systems. Depending on the application a grounding position is also possible.

In practice, with reference to FIG. 1 the circuit breaker assembly 4 can be moved from the service position shown in said figure, to a test/disconnected position and/or a grounding position, by sliding said assembly 4 toward the right-hand side of the figure. In order to do that, the circuit breaker assembly 4 is normally positioned on a sliding frame (not-shown) actuated from the outside of the casing 2. The sliding frame and its operation are well known in the art and will not be described in details here. In order to carry out the moving operation of the circuit breaker, an opening 5 is normally present of the front panel 21 of the switchgear 1, so as to allow the insertion and extraction of an operating handle.

A first drawback of the known solutions is due to the fact that the opening 5 allows a direct communication between the circuit breaker compartment and the outside of the switchgear 1, with safety concerns in case of faults, such as an internal arc.

Also, when the operating handle is inserted and the opening 5 is therefore closed (i.e. no direct communication between the inside and outside of the switchgear), a sudden increase of pressure inside the switchgear due to an internal fault may abruptly push away the handle with consequent safety concerns.

SUMMARY OF THE INVENTION

It is therefore an object of the present invention to provide a medium voltage switchgear in which the above-mentioned drawbacks are avoided or at least reduced.

More in particular, it is an object of the present invention to provide medium voltage switchgear having a greater degree of safety with respect to the conventional medium voltage switchgear.

As a further object, the present invention is aimed at providing a medium voltage switchgear in which the insertion/withdrawing operation of the circuit breaker can be carried out in an always safe way.

A further object of the present invention is to provide a medium voltage switchgear in which the separation between the inside and outside is always maintained.

Another object of the present invention is to provide a medium voltage switchgear having a reduced number of mechanical parts.

Another object of the present invention is to provide a medium voltage switchgear having a withdrawing system of the circuit breaker with improved functionality Still another object of the present invention is to provide a medium voltage switchgear with reduced manufacturing, installation and maintenance costs.

Thus, the present invention relates to a medium voltage switchgear which is characterized in that it comprises a casing defining an internal volume for housing at least a circuit breaker assembly movable between at least two operative positions, said casing comprising a front panel provided with an opening for the insertion of an operating handle for actuating the movement of said circuit breaker assembly between said operative positions, a closing and retaining device being positioned in correspondence of said opening and being movable between a closed position when said operating handle is not inserted and an open position for allowing insertion of said operating handle, said closing and retaining device comprising locking means for retaining said operating handle in position when inserted in said opening.

In this way, it is possible to overcome some of the disadvantages and drawbacks of the circuit breaker of the known art.

In particular, the presence of a closing and retaining device allows to keep the opening always covered and protected, thereby always separating the circuit breaker compartment from the outside of the switchgear Another important advantage derives form the fact that, as better explained in the following description, the operating handle, when inserted, is always locked and maintained in position by the closing and retaining device.

The medium voltage switchgear according to the invention preferably comprises a closing and retaining device comprising elastic retaining means, e.g. springs or equivalent means, for keeping it in said closed position, and opening means for its opening, said opening means comprising, for example, a manually operated knob that can be actuated by an operator.

In a preferred embodiment of the medium voltage switchgear according to the invention, said closing and retaining device comprises a first and a second plate respectively provided with a first and a second hole axially aligned with said opening when said closing and retaining device is in the open position, said first and a second plate covering and closing said opening when said closing and retaining device is in the closed position.

In such a case, said first and a second plate are preferably hinged on a common point, e.g. on the front panel, and rotate in opposite directions when passing from said closed to said open position.

Preferably, said first and a second plate are substantially C-shaped and comprises a first and a second lateral portion extending form a central portion.

According to a possible embodiment of the medium voltage switchgear of the invention, said first and a second plate respectively comprise a first and a second actuating surface extending therefrom and interacting with an actuating cam operatively coupled with said opening means. For instance, said first and second actuating surfaces can be positioned on the central portion of said first and a second plate which can be hinged on said common point in correspondence of said first lateral portion, while said first and second hole can be positioned on said second lateral portion of said first and second plate.

According to a possible embodiment of the medium voltage switchgear of the invention, said locking means comprise a cutout portion on the periphery of said first and second hole for engaging and retaining said operating handle.

BRIEF DESCRIPTION OF THE DRAWINGS

Further characteristics and advantages of the invention will emerge from the description of preferred, but not exclusive embodiments of a medium voltage switchgear according to the invention, non-limiting examples of which are provided in the attached drawings, wherein.

DETAILED DESCRIPTION OF THE INVENTION

Figure 1:
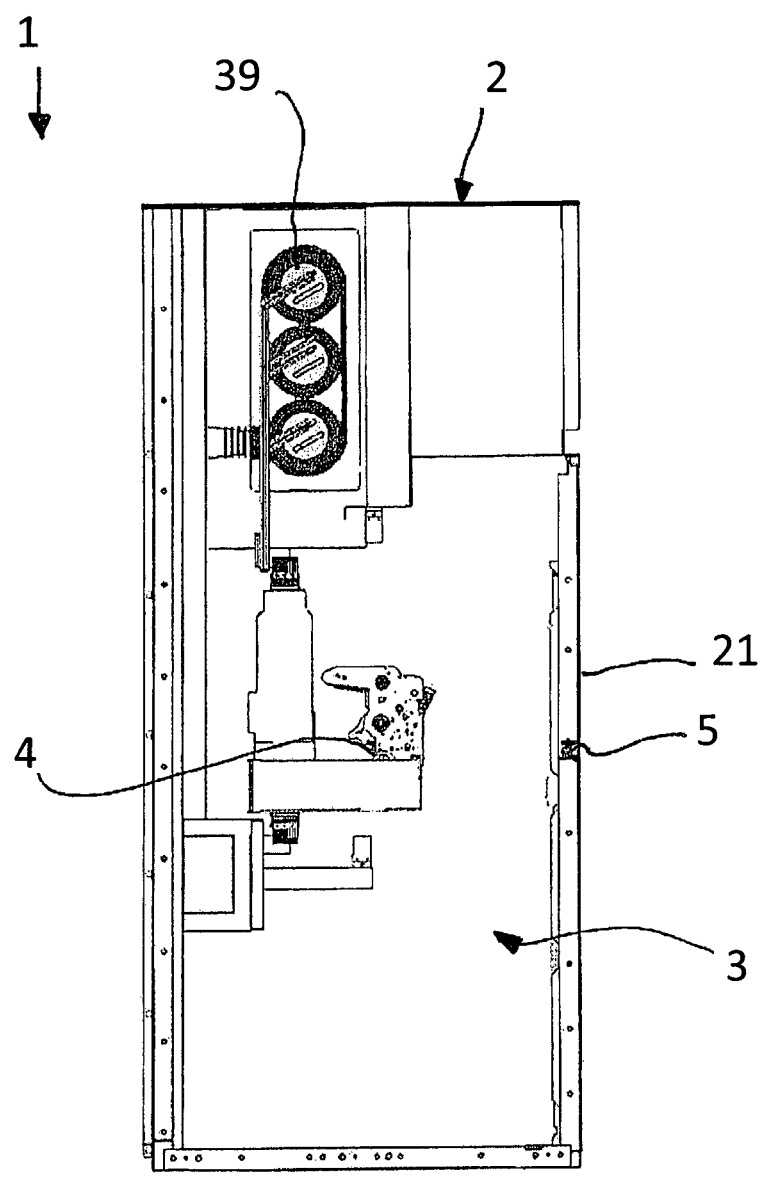
FIG. 1 is a schematic side view of a a medium voltage switchgear.

With reference to the attached figures, a medium voltage switchgear according to the invention, designed with the reference number 1, comprises, in its more general definition, a casing 2 which defines an internal volume 3.

At least a circuit breaker assembly 4 is housed inside the internal volume 3, said circuit breaker assembly 4 being movable between at least two operative positions, e.g. a test/disconnected position and a service position in which it is connected to the bus bar assembly 39. Other operative positions, e.g. a grounding position, are also possible.

To this purpose, the casing 2 normally comprises a front panel 21, e.g. a door, provided with an opening 5 for the insertion of an operating handle 8 which is used for actuating the movement of the circuit breaker assembly 4 between said operative positions.

With reference to FIG. 2-8, one of the characterizing features of the medium voltage switchgear according to the invention derives for the presence of a closing and retaining device 6 which is positioned in correspondence of said opening 5.

Figure 2:
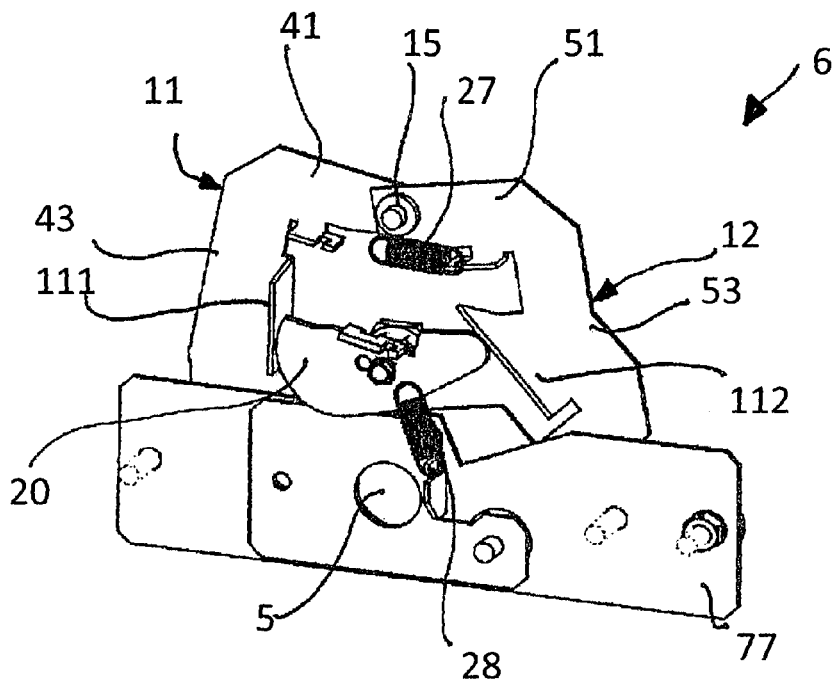
FIG. 2 is a first view of a first embodiment of a closing and retaining device used in a medium voltage switchgear according to the invention, shown in a first, open, position.
Figure 3:
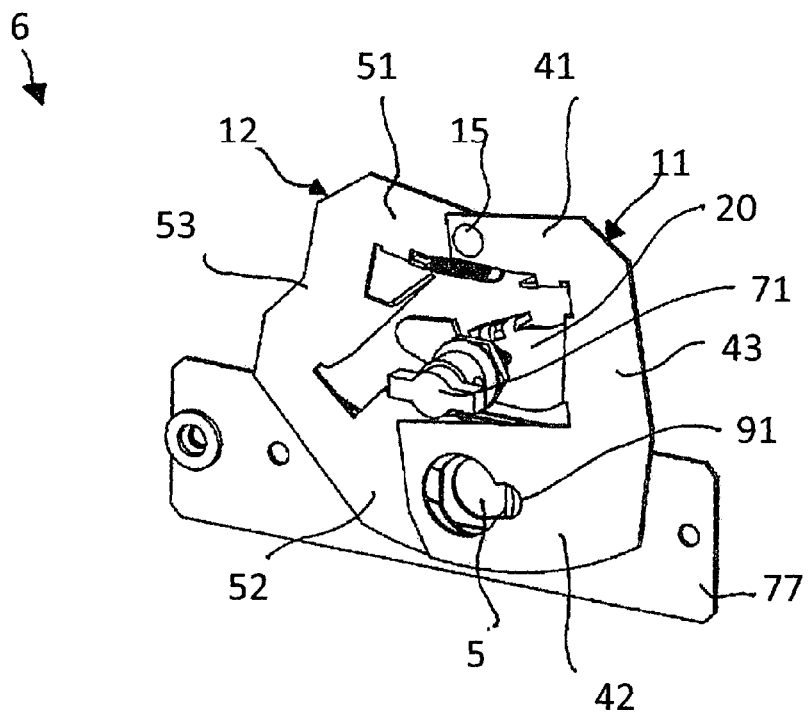
FIG. 3 is a second view of the closing and retaining device of FIG. 1.
Figure 4:
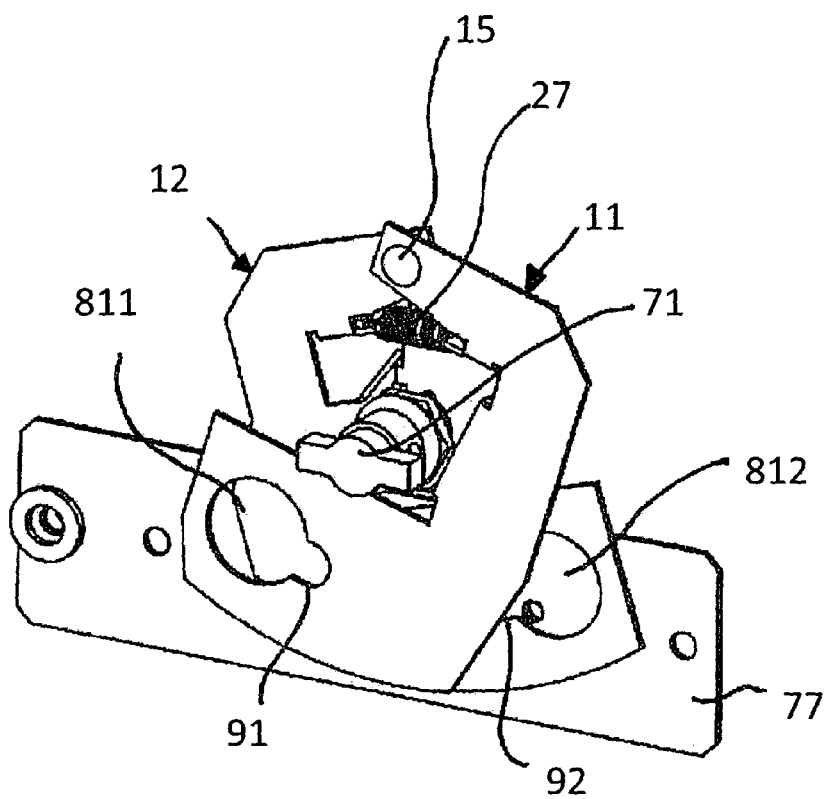
FIG. 4 is a first view of a first embodiment of a closing and retaining device used in a medium voltage switchgear according to the invention, shown in a second, closed, position.
Figure 5:
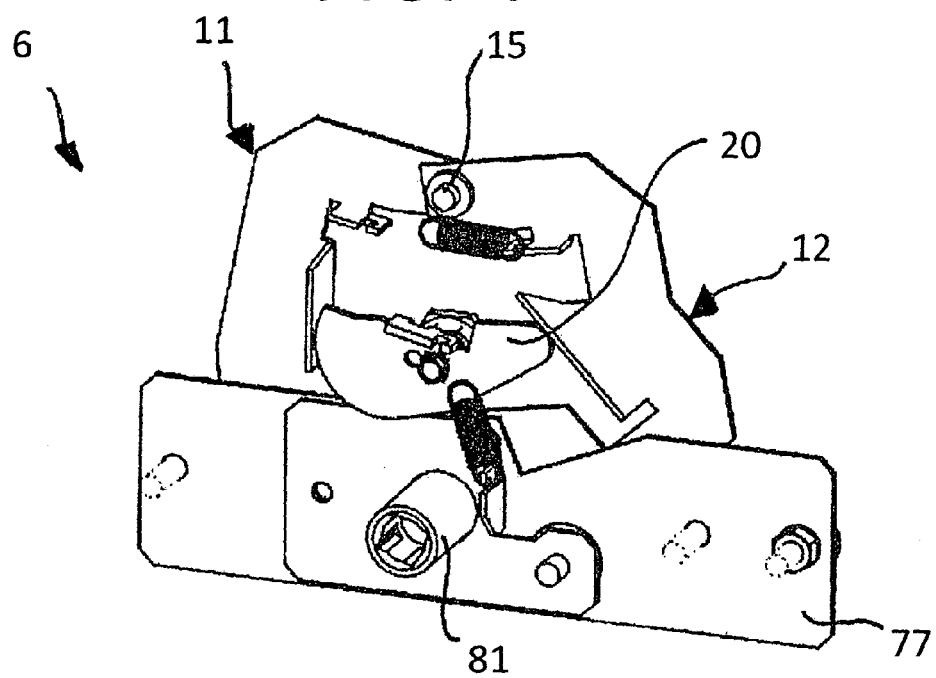
FIG. 5 shows the device of FIG. 2 with an operating handle inserted.
Figure 6:
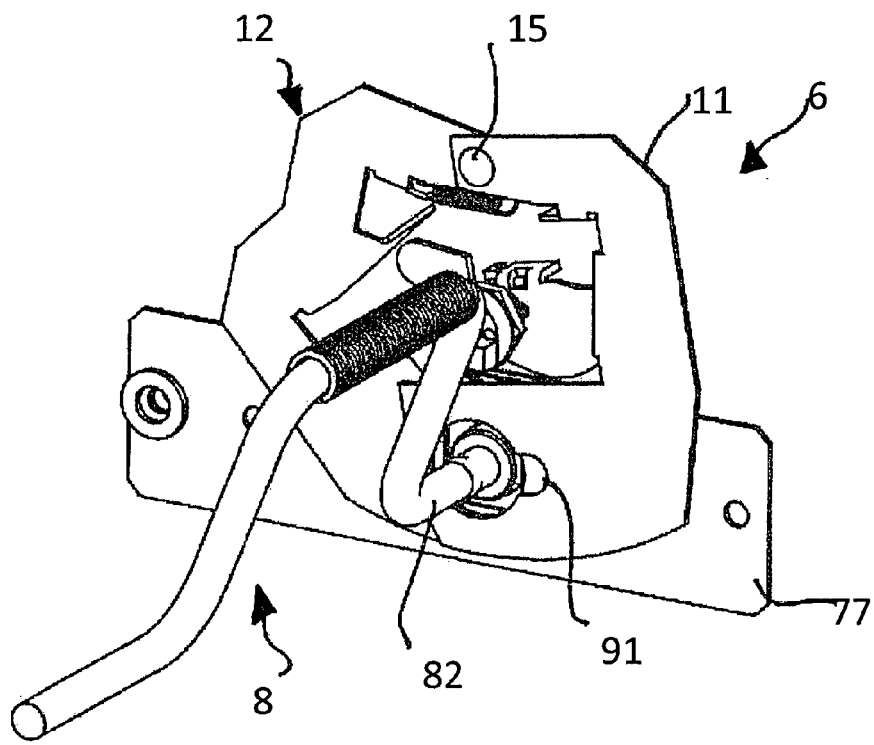
FIG. 6 shows the device of FIG. 3 with an operating handle inserted.
Figure 7:
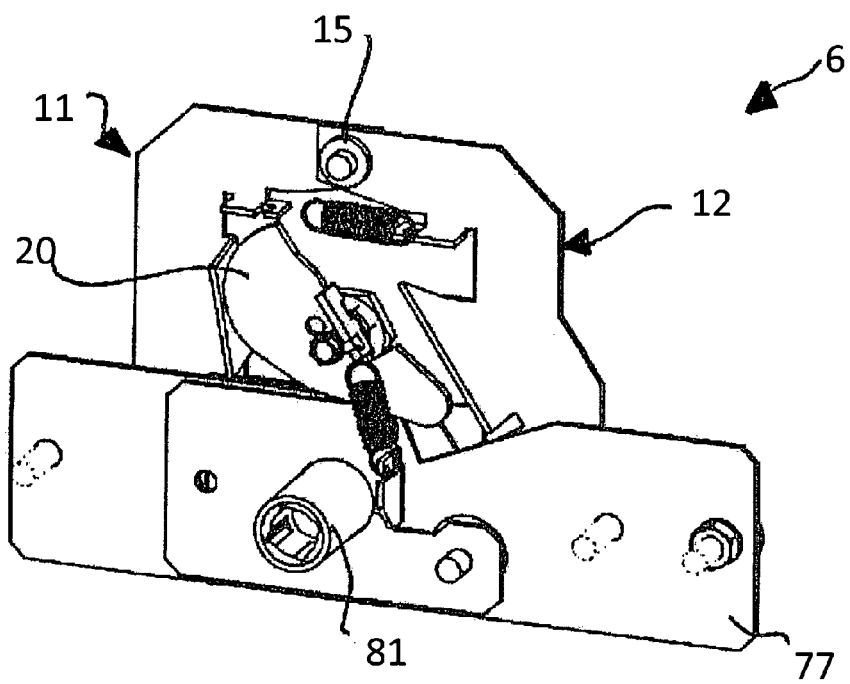
FIG. 7 shows a second view of the device of FIG. 4 with an operating handle inserted and locked.

In FIGS. 2-8, for sake of clarity, the front panel 21 is not shown. Also, FIGS. 3, 4, 6, and 8, show the side of the device 6 facing toward the outside of the switchgear, i.e., the side of the device positioned on the inside surface of the panel 21 and therefore normally non visible; FIGS. 2, 5, and 7 show the side of the device 6 facing toward the inside of the switchgear, i.e. facing inside the circuit breaker compartment. Moreover, in FIGS. 2, 3, 5, and 6, the closing and retaining device 6 is shown in the open position, while in FIG. 4 it is shown in the closed position. Also, in FIGS. 5 and 6 the operating handle is inserted but not locked, while in FIGS. 7 and 8 the operating handle is inserted and locked into place.

Figure 8:
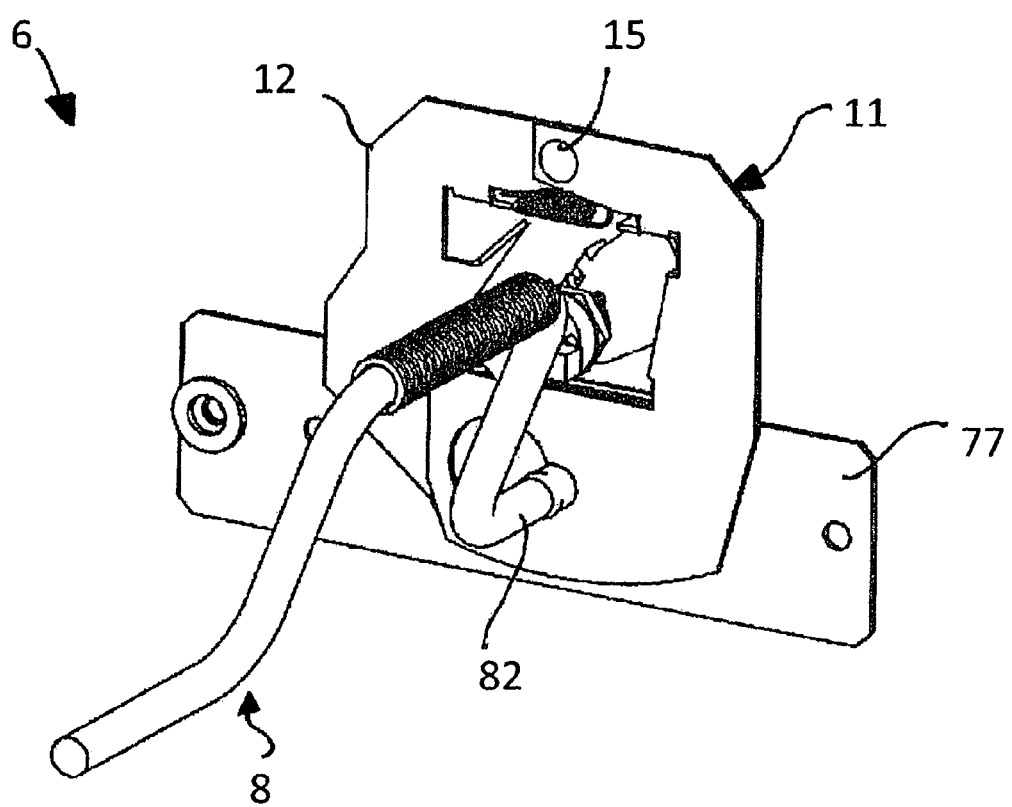
FIG. 8 shows the device of FIG. 4 with an operating handle inserted and locked.

The device 6 is movable between a closed position (FIG. 4) when said operating handle 8 is not inserted and an open position (FIGS. 2, 3, 5, and 6) for allowing insertion of said operating handle 8. Moreover, the closing and retaining device 6 further comprises locking means for retaining said operating handle 8 in position when it is inserted in said opening 5 (FIGS. 7 and 8).

Preferably, the closing and retaining device 6 comprises elastic retaining means for keeping it in said closed position and opening means for its opening, said opening means being, for instance, a manually operated knob 71 positioned on the outside of the front panel 21. A fixing plate 77 can be used to fix part of the device 6 to the panel 21.

According to the embodiment shown in the attached figure, said closing and retaining device 6 comprises a first 11 and a second 12 plate which are respectively provided with a first 811 and a second 812 hole axially aligned with the opening 5 when said closing and retaining device 6 is in the open position, said first 11 and second 12 plate covering and closing said opening 5 when said closing and retaining device 6 is in the closed position.

Preferably, the first 11 and a second 12 plate are hinged on a common point 15 and rotate in opposite directions when passing from said closed to said open position, said common point 15 being preferably positioned on the front panel 21. Thus, with reference to FIG. 4, when the operating knob 71 is actuated by an operator, the plate 12 rotates clockwise and the plate 11 rotates counterclockwise bringing the device 6 in the position of FIGS. 2 and 3.

In the embodiment shown, the first 11 and a second 12 plate are substantially C-shaped and comprises a first 41, 51 and a second 42, 52 lateral portion extending form a central portion 43, 53. Moreover, the first 11 and a second 12 plate respectively comprise a first 111 and a second 112 actuating surfaces extending therefrom and interacting with an actuating cam 20 which is operatively coupled with the opening means 71.

The first 111 and second 112 actuating surfaces can be conveniently positioned on the central portion 43, 53 of said first 11 and a second 12 plate.

Also, the first 11 and second 12 plate can be hinged on said common point 15 in correspondence of said first 41, 51 lateral portion, and said first 811 and second 812 hole can be positioned on said second 42, 52 lateral portion of said first 11 and a second 12 plate.

Preferably, the locking means comprise a cutout portion 91, 92 on the periphery of said first 811 and second 812 hole for engaging and retaining said operating handle 8.

In the embodiment shown, the elastic retaining means can comprise, for example, a first spring 27 operatively coupled to said first 11 and second 12 plate and a second spring 28 operatively coupled to said actuating cam 20.

The operating sequence can be described as follows.

Starting from the position of FIG. 4, the closing and retaining device 6 is in the closed position and the plates 11 and 12 are kept in such position by the spring 27 acting thereon. In the closed position the second lateral portions 42, 52 of the plates 11 and 12 completely cover the opening 5, thereby separating the circuit breaker compartment from the outside of the switchgear 1.

By acting on the knob 71, the cam 20 is rotated so as to act on the actuating surfaces 111 of the first plate 11 and 112 of the second plate 12. In this way, the plate 11 rotates counterclockwise and the plate 12 rotates clockwise so as to reach the position of FIGS. 2 and 3 in which the first 811 and second 812 hole are axially aligned with the opening 5.

In said position it is possible to insert the head 81 of the operating handle in the opening 5 until it is engaged with the actuating equipment for the movement of the circuit breaker, as shown in FIGS. 5 and 6.

By releasing the action on the knob 71, the cam 20 tends to return to the initial position due to the action of the spring 28. At the same time, since the cam 20 is no longer acting on the actuating surfaces 111 and 112, also the plates 11 and 12 tends to return to the initial position du to the action of the spring 27. In this way, the cutout portions 91 and 92 on the periphery of the first 811 and second 812 hole engage the stem 82 of the operating handle 8, thereby locking it into the inserted position.

The opposite action is carried out to remove the handle.

Starting from the position of FIGS. 7 and 8, the operating knob 71 is actuated so as to rotate the cam 70 which acts on the actuating surfaces 111 and 112 determining rotation of the plates 11 and 12 until they reach the position of FIGS. 5 and 6. In such position the operating handle is unlocked and can be removed with the device 6 remaining in the position of FIGS. 2 and 3. At this point, by releasing the knob 71, the cam 20 is restored in the position of FIG. 4 due to the action of the spring 28; at the same time, the plates 11 and 12 return to the position of FIG. 4 due to the action of the spring 27, thanks to the action of the spring 27, thereby closing the opening 5.

Thus, as explained above, the medium voltage switchgear of the invention allows to achieve a higher degree of safety with respect to the conventional switchgear. In particular, the opening which is needed to insert the operating handle is always kept closed and protected when the operating handle is not inserted. Therefore, there is always a separation between the circuit breaker compartment and the outside of the switchgear, It is also worth mentioning that when the operating handle is inserted it is not possible for it to be pushed away or accidentally extracted, thanks to the presence of the closing and retaining device. Consequently, a safe situation and a safe operation of the circuit breaker withdrawal/insertion is always guaranteed.

Moreover, of the closing and retaining device can be realized in a relatively simple manner, with reduced mechanical complexity and with a reduced number of pieces, thereby non contributing in a significant manner to the overall costs of the switchgear.

The medium voltage switchgear thus conceived may undergo numerous modifications and come in several variants, all coming within the scope of the inventive concept. Moreover, all the component parts described herein may be substituted by other, technically equivalent elements. In practice, the component materials and dimensions of the device may be of any nature, according to need and the state of the art.

The invention claimed is:

1. A medium voltage switchgear comprising a casing-defining an internal volume for housing at least a circuit breaker assembly movable between at least two operative positions, said casing comprising a front panel provided with an opening for the insertion of an operating handle for actuating the movement of said circuit breaker assembly between said operative positions, a closing and retaining device being positioned in correspondence of said opening and movable between a closed position when said operating handle is not inserted and an open position for allowing insertion and withdrawal of said operating handle, said closing and retaining device comprising locking means for axially locking said operating handle in position when inserted in said opening to thereby prevent withdrawal of the handle from said opening.

2. The medium voltage switchgear according to claim 1, wherein said closing and retaining device comprises elastic retaining means for keeping said closing and retaining device in said closed position and opening means for opening said closing and retaining device.

3. The medium voltage switchgear according claim 2, wherein said closing and retaining device comprises a first and a second plate respectively provided with a first and a second hole axially aligned with said opening when said closing and retaining device is in the open position, said first and second plate covering and closing said opening when said closing and retaining device is in the closed position.

4. The medium voltage switchgear according to claim 1, wherein said closing and retaining device comprise a manually operated knob.

5. The medium voltage switchgear according claim 4, wherein said closing and retaining device comprises a first and a second plate respectively provided with a first and a second hole axially aligned with said opening when said closing and retaining device is in the open position, said first and second plates covering and closing said opening when said closing and retaining device is in the closed position.

6. The medium voltage switchgear according to claim 1, wherein said closing and retaining device comprises a first and a second plate respectively provided with a first and a second hole axially aligned with said opening when said closing and retaining device is in the open position, said first and second plates covering and closing said opening when said closing and retaining device is in the closed position.

7. The medium voltage switchgear according to claim 6, wherein said first and second plates are hinged on a common point and rotate in opposite directions when passing from said closed to said open position.

8. The medium voltage switchgear according to claim 7, wherein said first and second plates are hinged on said front panel.

9. The medium voltage switchgear according to claim 8, wherein said first and second plates are substantially C-shaped and comprises a first and a second lateral portion extending form a central portion.

10. The medium voltage switchgear according to claim 8, wherein said first and second plates respectively comprise a first and a second actuating surface extending therefrom and interacting with an actuating cam operatively coupled with said opening means.

11. The medium voltage switchgear according to claim 7, wherein said first and second plates are substantially C-shaped and comprises a first and a second lateral portion extending form a central portion.

12. The medium voltage switchgear according to claim 7, wherein said first and second plates respectively comprise a first and a second actuating surface extending therefrom and interacting with an actuating cam operatively coupled with said opening means.

13. The medium voltage switchgear according to claim 6, wherein said first and second plates are substantially C-shaped and comprises a first and a second lateral portion extending from a central portion.

14. The medium voltage switchgear according to claim 13, wherein said first and second plates respectively comprise a first and a second actuating surface extending therefrom and interacting with an actuating cam operatively coupled with said opening means.

15. The medium voltage switchgear according to claim 6, wherein said first and second plates respectively comprise a first and a second actuating surface extending therefrom and interacting with an actuating cam operatively coupled with an opening means opening said closing and retaining device.

16. The medium voltage switchgear according to claim 15, wherein said first and second actuating surfaces are positioned on a central portion of said first and second plates.

17. The medium voltage switchgear according to claim 15, wherein said first and second plate are hinged on a common point in correspondence of a first lateral portion, said first and second hole being positioned on a second lateral portion of said first and second plates.

18. The medium voltage switchgear according to claim 15, wherein said closing and retaining device comprises elastic retaining means including a first spring operatively coupled to said first and second plates and a second spring operatively coupled to said actuating cam.

19. The medium voltage switchgear according to claim 15 said first and second actuating surfaces are positioned on a central portion of said first and second plates.

20. The medium voltage switchgear according to claim 6, wherein said locking means comprise a cutout portion on the periphery of said first and second hole for engaging and retaining said operating handle.

* * * * *